Nov. 11, 1958  M. R. CARLSON  2,860,298

CONDITION REGULATING SERVOSYSTEM

Filed March 15, 1956

INVENTOR.
Milton R. Carlson
BY
Carlson, Pitzner, Hubbard & Wolfe
ATTORNEY

United States Patent Office 2,860,298
Patented Nov. 11, 1958

2,860,298

CONDITION REGULATING SERVOSYSTEM

Milton R. Carlson, Rockford, Ill., assignor to Barber-Colman Company, Rockford, Ill., a corporation of Illinois Application March 15, 1956, Serial No. 571,709

11 Claims. (Cl. 318—448)

This invention relates generally to condition regulating apparatus of the so-called floating type in which correction for deviation of a condition from a desired value is effected at a rate proportional to the amount of the deviation. More particularly, the invention relates to an automatic controller in which operation of a condition regulator or final control element is controlled by one or more relays energized in response to deviation of the condition.

The general object of the invention is to provide a novel relay-operated controller which achieves the desired controller action with components of low weight and small size, which is rugged, and which avoids relay contact chatter normally accompanying vibration and gradual changes of the relay current through its operating values.

Another object is to proportion the rate of correction of the condition and to obtain positive relay action by varying the relay energizing current both in response to condition changes and under the control of novel pulsing and detenting circuits which are rendered effective as an incident to relay pull-in and drop-out.

A more detailed object is to reduce the size and weight of the controller by a novel arrangement of the pulsing and detenting circuits enabling the latter to be controlled by a single set of relay contacts.

The invention also resides in the novel and simple arrangement of pulsing and detenting circuits for controlling opposite movements of a reversible condition regulating member.

Figure 1:
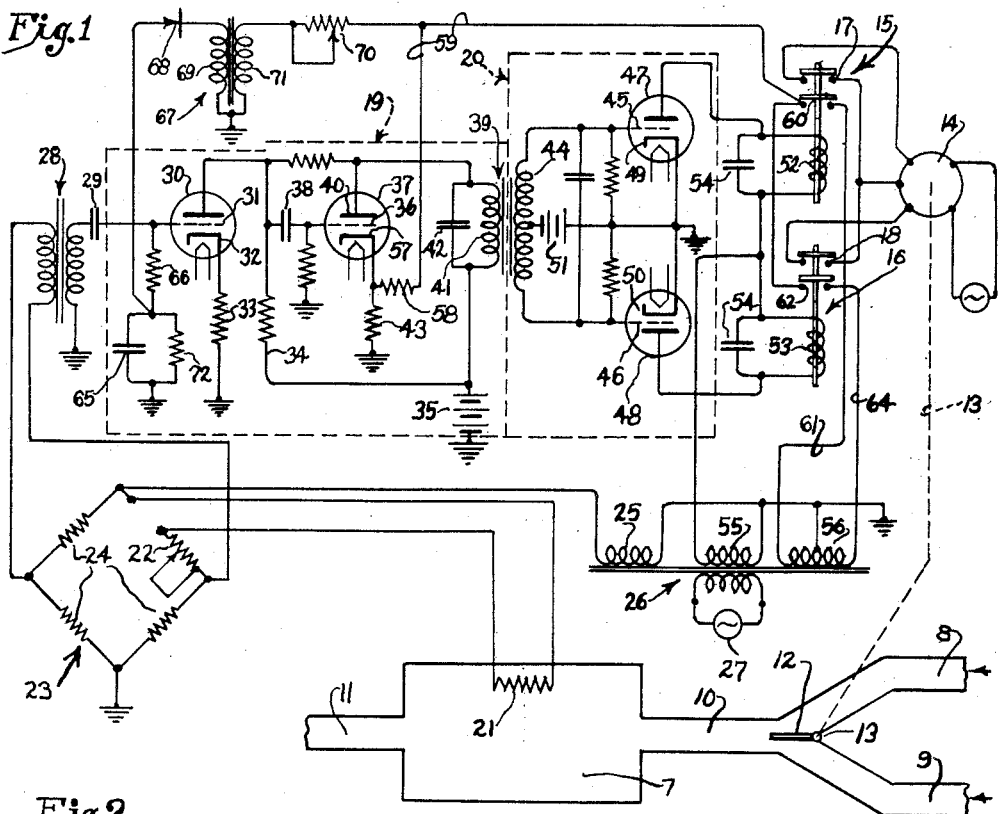

Other objects and advantages of the invention will become apparent from the following detailed description taken in connection with the accompanying drawings, in which Figure 1 is a schematic view and wiring diagram of a control system embodying the novel features of the present invention.

Figure 2:
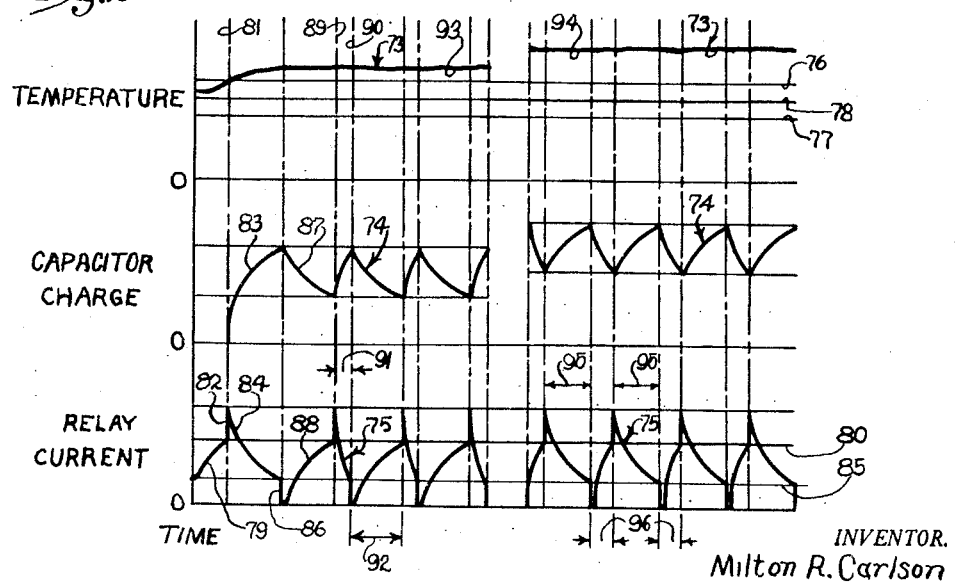

Fig. 2 is a time chart illustrating different conditions of operation of the system.

While the invention is adaptable to different types of systems for controlling various conditions such as temperature, speed, or position, I have shown in the drawings and will describe in detail herein the preferred embodiment which is a so-called proportional-speed floating control for regulating the temperature of a space 7 such as a cockpit of an airplane and maintaining the same at a desired value. It is to be understood, however, that I do not intend to limit the invention by such disclosure but aim to cover all modifications and alternative constructions falling within the spirit and scope of the invention as expressed in the appended claims.

In the exemplary control, the temperature of air in the controlled space 7 is regulated by varying the relative proportions of hot air and cool air delivered under pressure from suitable sources (not shown) respectively through a hot air duct 8 and through a cool air duct 9 to a common inlet duct 10 communicating with the space, air being exhausted from the latter through an outlet port 11. Proportioning of the relative amounts of hot and cool air is effected by a damper 12 constituting a regulating member or final control element and movable back and forth between a full-heating position in which the damper closes the cool air duct 9 and a full-cooling position in which the damper closes the hot air duct 8. The damper is connected to the shaft 13 of a reversible motor 14 and is moved in opposite directions at relatively slow rates upon selective energization of relays 15 and 16 having contacts 17 and 18 connected respectively in forward and reverse motor control circuits.

To correct for deviations of the controlled temperature from the desired value, the relays are energized in response to an alternating current signal variable in phase and amplitude in accordance with such deviations and applied to the relays selectively through an electronic amplifier 19 and a phase detector 20. Herein, the temperature changes are detected by a temperature sensing resistor 21 located in the heated space and connected in series with a variable resistor 22 in one arm of a bridge 23 having three fixed resistors 24 in its other arms and supplied alternating current at its input terminals by a secondary winding 25 of a transformer 26 whose primary winding is connected to a suitable alternating current source 27.

The temperature variable signal at the output terminals of the bridge 23 is applied through a transformer 28 and a capacitor 29 to the amplifier 19 which, in this instance, comprises two stages. The first of these is formed by a vacuum tube 30 having a control grid 31 connected to the coupling capacitor 29 and a cathode 32 connected to ground through a self-biasing resistor 33. The grid 31 is connected to ground through the grid resistor 66, and the parallel combination of resistor 72 and capacitor 65 to complete the amplifier input circuit. The output circuit of the first stage including a load resistor 34 and a direct current power supply 35 is coupled to the grid 36 of the second stage triode 37 by a capacitor 38. A coupling transformer 39 transmits the amplified signal to the phase detector 20 from the second stage output circuit which extends in series from the plate 40 of the tube to the cathode through a parallel combination of the primary winding 41 of the transformer and a tuning capacitor 42, the power supply 35, ground, and a self-biasing resistor 43.

In the phase detector 20, opposite terminals of the secondary winding 44 of the coupling transformer 39 are connected to the grids 45 and 46 of two phase detector triodes 47 and 48 whose cathodes 49 and 50 are connected together and to ground. The center tap of the winding is connected to ground through a direct current source 51 which biases the grids negatively relatively to the cathodes. The plate circuits of the triodes extend through the respective coils 52 and 53 of the relays 15 and 16 and individual parallel smoothing capacitors 54 and a common secondary winding 55 of the power transformer 26 for applying voltage of the same phase to the plates. Due to connection of the grids to opposite ends of the coupling secondary 44, the voltages applied by the latter to the grids are out of phase with each other. Thus, when the temperature variable signal is of one phase, one triode 47 conducts to provide a current of one polarity for energization of its relay coil 52 and movement of the damper 12 in a direction to correct the temperature while the other triode remains nonconductive. Conversely, when the signal is of the opposite phase, the other triode 48 conducts to provide a current of the opposite polarity for energization of its relay coil 53, the first triode then being nonconductive.

To obtain positive relay action and avoid chatter of the contacts due to vibration, means is provided to vary the current of each of the relay coils 52 and 53 abruptly through its pull-in and drop-out values even though the controlled temperature changes gradually through its values which correspond to the relay pull-in and drop-out current values. This means comprises detent circuits individual to the relays and each operable as an incident to pull-in of the associated relay to effect an increase of the relay current and, as an incident to drop-out of the relay, to effect a decrease of the current. Such increase and decrease of the current for each relay preferably are accomplished by applying to and removing from the amplifier 19 a bias voltage. Where, as in this instance the condition variable input signal is alternating in character and of different phases, the bias voltages for the two relays preferably are similarly alternating and of corresponding phases.

Herein, detent voltages of opposite phase are derived from opposite end terminals of a secondary winding 56 of the power transformer 26 with a grounded center tap and are applied to the cathode 57 of the second stage triode 37 through a resistor 58 and a conductor 59. To complete the detent circuit of the first relay 15, the conductor 59 is connected to one end terminal of the transformer secondary 56 through normally open contacts 60 of the relay and a conductor 61, the voltage applied to the second stage cathode 57 through this circuit being of the proper phase to increase the current in the plate circuit of the first phase detector tube 47 when the latter conducts for pull-in of the first relay. The second detent circuit is completed by closure of normally open contacts 62 of the second relay 16 to connect the conductor 59 to the other end terminal transformer secondary 56 through a conductor 64 for applying to the second stage cathode 57 a voltage out of phase with that of the first detent circuit but effective to increase the plate current of the second tube 48 of the phase detector when this tube is conducting for pull-in of the second relay 16.

To provide floating control action in which the rate of delivery of heat to the controlled space varies in proportion to the amount of deviation of the controlled temperature from the desired value, the motor 14 is energized to move the damper 12 in a direction to correct for the deviation during time intervals which are substantially shorter than that required for movement of the damper through its full range and which vary in length and spacing from each other according to the amount of the temperature deviation. In accordance with the present invention, such energization of the motor in pulses is effected along with the relay detenting action as an incident to actuation of the relays 15 and 16 through the provision of novel pulsing or proportioning circuits corresponding to the respective detent circuits and each operable to apply a bias to the amplifier 19 for changing the relay current in opposition to but at a slower rate than the corresponding detent circuit. The pulsing and detent circuits of each relay preferably are controlled by the same set of relay contacts and include the same voltage source thereby simplifying the apparatus and reducing its size and weight.

The pulse proportioning bias is applied in this instance between the grid 31 and the cathode 32 of the first stage triode 30 and appears as the voltage across an energy storage device in the form of a capacitor 65 common to the pulsing circuits of both relays 15 and 16 and connected to the grid through a resistor 66 and to the cathode through ground and the self-biasing resistor 33. To decrease the relay current in opposition to the detent bias as an incident to pull-in of each relay, the grid side of the capacitor is coupled to the common detent circuit conductor 59 through a transformer 67 and a rectifier 68 connected in series with the transformer secondary winding 69 between the latter and the capacitor and polarized to pass current for charging the grid side of the capacitor negatively. Thus, when either of the sets of relay contacts 60 and 62 closes to complete the corresponding detent circuit, the associated pulsing circuit is established through the same contacts, the active half of the transformer secondary 56, the conductor 59, the charging transformer 67, and the rectifier 68 for charging the capacitor with its grid side negative.

The time interval required for the capacitor 65 to reach a given charge may be adjusted by varying the value of a resistor 70 in series with the primary winding 71 of the charging transformer 67 and thereby the value of charging voltage available. Discharge of the capacitor is effected during drop-out of the relays through a resistor 72 connected in parallel with the capacitor. To insure that the capacitor will become charged to a value sufficient to overcome the input signal and the effect of the detent voltage and reduce the current in the active one of the relays 15 and 16 to its drop-out value, the rate of discharge determined by the time constant of the discharge circuit is correlated with the value of charging voltage and the time constant of the charging circuit and preferably is slower than the charging rate.

The operation of the improved control will be described in connection with Fig. 2 in which curves 73, 74 and 75 respectively represent the controlled temperature, the charge on the pulsing capacitor 65, and the approximate average value of the direct current in the coil of the active one of the relays 15 and 16 all plotted against time. Assuming that current is available at the various sources and that the controlled temperature is within a deadband range between two values indicated by lines 76 and 77 but above the desired value 78 and has remained in this range long enough for discharge of the capacitor 65, some current will flow in the relay which responds to increases of temperature, for example, the first relay 15, but such current is of a value indicated at 79 below the pull-in value 80. The relay current increases as the controlled temperature increases and, when the latter rises above the high deadband limit 76 as indicated along a line 81, the relay current reaches its pull-in value 80, the current in the second relay 16 remaining near zero due to the bias of the source 51 and to the out of phase relation of the grid and plate voltages of the second tube 48 of the phase detector.

Upon pull-in of the first relay 15, the contacts 17 close to complete the associated control circuit for the motor 14 so that the damper 12 is shifted toward the full-cooling position to decrease the proportion of hot air to cool air and thereby the amount of heat delivered to the controlled space 7. At the same time, the contacts 60 close to complete the first detent circuit which extends from ground through one-half of the transformer secondary 56, the conductor 61, the contacts 60, the conductor 59, the resistor 58, and the self-biasing resistor 43 back to ground. The grid 36 of the second amplifier tube 37 thus is biased by an alternating voltage bias in phase with the input signal and the voltage on the plate 40 so as to increase the relay current abruptly as indicated at 82 on the curve 75.

Closure of the contacts 60 of the first relay 15 also completes the associated pulsing circuit for charging the capacitor 65. This circuit extends from ground through one-half of the transformer secondary 56 and the conductors 61 and 59 in common with the first detent circuit and then through the charging transformer 67, the rectifier 68, and back to ground through the capacitor 65. With this circuit completed, the capacitor charge increases as indicated at 83 on the curve 74 to bias the grid 31 of the first amplifier tube 30 in a cut-off direction. As this charge increases, the voltage gain of the tube 30 decreases, the output signal of the first stage decreases in magnitude, and the relay current decreases as indicated at 84 until finally, when the charge is large enough to overcome the input signal from the bridge 23 and also the effect of the detent voltage in the input circuit of the second amplifier stage, the relay current reaches the drop-out value 85 and both sets of contacts 17 and 60 open to interrupt the motor circuit, the detent circuit, and the capacitor charging circuit.

Removal of the detent voltage upon interruption of the detent circuit at the contacts 60 results in an abrupt decrease of the relay current to zero as indicated at 86 thereby insuring that the relay contacts do not chatter during drop-out. The charging circuit also being open, the capacitor 65 begins to discharge through the resistor 72 as indicated at 87 with corresponding increases of voltage gain of the tube 30 and of the relay current as indicated at 88. When the capacitor charge has decreased far enough in relation to the input signal from the bridge 23, the relay current again reaches its pull-in value 80 as indicated along a line 89 and the first relay 15 pulls in to complete the motor, detent, and charging circuits again. The relay then remains pulled-in until the capacitor charge again overcomes the effects of the input signal and the detent bias to reduce the relay current to its drop-out value as indicated along a line 90. Such alternate pull-in and drop-out of the relay and the accompanying energization and deenergization of the motor 14 continue for incremental movements of the damper 12 toward the full-cooling position during the time that the temperature remains above the high value 76 of the dead band.

After the capacitor 65 has become charged initially as indicated at 83 upon deviation of the controlled temperature above the high deadband value 76, the length of each pull-in or "on" period indicated at 91 is the time required for the capacitor to become charged to a voltage high enough to overcome the effects of both the detent voltage and the input signal from the bridge 23. The detent and capacitor charging voltages and the time constant of the charging circuit being relatively invariable, this charging time is directly proportional to the level of the input signal and varies with the amount of charge on the capacitor when the charging circuit is completed. The length of each drop-out or "off" period indicated at 92, that is, the time required for discharge of the capacitor far enough that the input signal is effective to raise the relay current to the pull-in value 80, is inversely proportional to the amplitude of the input signal, but also varies with the amount of charge on the capacitor when the charging circuit is interrupted, the time constant for the discharge circuit also being relatively invariable. Thus, with the input signal of low amplitude accompanying a small temperature deviation indicated at 93, the "on" periods 91 are relatively short and the "off" periods 92 are relatively long. With a greater temperature deviation indicated at 94 and a correspondingly larger input signal amplitude, the charge on the capacitor 65 at the times of completion and interruption of the charging circuit is correspondingly higher and the "on" and "off" periods indicated at 95 and 96 respectively are longer and shorter.

When the controlled temperature falls below the low deadband value 77, the second relay 16 alternately pulls in and drops out in a manner similar to the first relay 15 described above and the motor 14 operates periodically to move the damper 12 toward the full-heating position for increasing the heat delivered to the controlled space. In this case, the detent and pulsing circuits extend through the other half of the transformer secondary 56, the conductor 64, and the contacts 62, the remainder of these circuits being common to the corresponding circuits of the first relay 15. Since the periods of energization of the motor 14 in each direction vary in length in proportion to the amount of temperature deviation and are substantially shorter than the period required for moving the damper through its full range, the damper continues to move during the time the temperature deviates and its average rate of movement is proportional to the amount of deviation.

It will be apparent from the foregoing that the current through the respective relays 15 and 16 changes abruptly through the pull in and drop-out values 80 and 85 even though the controlling condition variable signal and the proportioning bias across the capacitor 65 change gradually through values corresponding to the relay pull-in and drop-out values. Thus, chatter of the relay contacts is avoided and the relays are capable of withstanding vibrations without shock mountings. Such positive relay action is achieved along with proportional floating control by controlling the detent and pulsing circuits for each relay as an incident to pull-in and drop-out of the relay and by the novel correlation of the pulse proportioning voltage of the capacitor 65 with the condition variable signal and the effective value of detent bias voltage. By utilizing the same set of contacts for both the detent and pulsing circuits of each relay as made possible by deriving power for these circuits from the same source 56, the relay may be small and the size and weight of the apparatus are correspondingly small, this being especially desirable in such applications as aircraft controls. The control is simplified further by using the same detent bias resistor 58 and the same pulse timing elements including the capacitor 65 and rectifier 68 for the pulsing and detent circuits of both relays.

I claim as my invention:

1. In a control system, the combination of, an electronic amplifier and phase detector unit providing output currents variable in polarity and magnitude with changes in phase and amplitude of an alternating current input signal, relay means sensitive to changes in said output current and having a set of first contacts closed in response to an output current of one polarity above a high level and open when the current is below a low level, said relay means having a set of second contacts closed in response to an output current of the opposite polarity above a high level and open when the current is below a low level, means providing first and second sources of alternating current of different phases, first and second detenting circuits extending respectively through said first source and said first contacts and through said second source and said second contacts and each operable, when completed by closure of the associated contacts, to apply a bias to said unit for increasing the magnitude of the prevailing output current abruptly, and first and second pulse proportioning circuits extending respectively through said first source and said first contacts and through said second source and said contacts and each operable, when completed by closure of the associated contacts, to apply a bias to said unit in a direction to decrease the magnitude of the prevailing output current, said proportioning circuits including common timing elements operable when each circuit is closed to decrease the magnitude of the prevailing output current to said low level after closure of the circuit and at the end of a time interval proportional to the amplitude of said input signal.

2. In a control system, the combination of, an electronic amplifier and phase detector unit providing output currents variable in polarity and magnitude with changes in phase and amplitude of an alternating current input signal, relay means sensitive to changes in said output current and having a set of first contacts closed in response to an output current of one polarity above a high level and open when the current is below a low level, first detent and proportioning circuits each including said contacts for completion of the circuit when the contacts are closed, said relay means having a set of second contacts closed in response to an output current of the opposite polarity above a high level and open when the current is below a low level, and second detent and proportioning circuits each including said second contacts for completion of the circuit when the contacts close, each of said detent circuits operating when closed to increase the prevailing output current abruptly for positive action of said relay means and said proportioning circuits including common timing elements and each operating to decrease the prevailing output current gradually for bringing the same to said low level thereof after closure of the circuit and at the end of a time interval proportional to the amplitude of said input signal.

3. In a control system, the combination of, an electronic amplifier and phase detector unit providing output currents variable in polarity and magnitude with changes in phase and amplitude of an alternating current input signal, a relay responsive to an output current of one polarity and adapted to drop out when the current is below a low level and to pull in when the current is above a high level, first detent and proportioning circuits including contacts of said relay for completion of the circuits when the relay pulls in, a second relay responsive to an output current of the opposite polarity and adapted to drop out when said output current is below said low level and to pull in when the current is above said high level, and second detent and proportioning circuits each including contacts of said second relay for completion of the circuits when the relay pulls in, each of said detent circuits operating when closed to increase the magnitude of the prevailing output current abruptly for positive action of the associated relay and said proportioning circuits including common timing elements and each operating to decrease the magnitude of the prevailing output current gradually for bringing the same to said low level after closure of the circuit and at the end of a time interval proportional to the amplitude of said input signal.

4. In a control system, the combination of, an electronic amplifier having an input circuit and providing an amplified output current variable in amplitude with corresponding changes of an alternating current input signal, a relay sensitive to changes in said output current and having a set of contacts open when the current is below a low level and closed when the current is above a high level, a detent circuit including said contacts and a source of alternating current and operable when the contacts are closed and opened respectively to cause said output current to increase and decrease abruptly, a capacitor connected to said input circuit for varying the bias thereof in accordance with the amount of charge on the capacitor, a charging circuit for said capacitor including said source, said contacts, and a rectifier and operable when the contacts are closed to charge the capacitor for biasing said input circuit in a nonconductive direction and decreasing said output current to said low level at the end of a time interval directly proportional to the amplitude of said input signal, and a circuit for discharging said capacitor upon interruption of said charging circuit to reduce the nonconductive bias and increase said output current to said high level at the end of a time interval inversely proportional to said input signal amplitude.

5. In a control system, the combination of, electronic amplifier means providing an amplified output current variable in magnitude with changes of a variable input signal, an energy storage device controlling said output current and operable to decrease the same as the amount of stored energy increases, a discharge circuit connected to said device for release of energy therefrom, means providing a current source, a charging circuit operable when closed to connect said source to said device to increase the amount of energy stored therein, a detenting circuit including said source and operable when closed to apply a bias to said amplifier means for increasing said output current, and a relay having a set of contacts common to said charging and detenting circuits and operable to complete the circuits when the value of said output current is above a high level and to interrupt the circuits upon decrease of the current to a low level, said detenting circuit producing abrupt changes in the level of said output current as the latter increases through said high level and decreases through said low level and said energy storage device operating, after completion of said charging circuit, to decrease the output current gradually to said low value at the end of a time interval proportional to the magnitude of said input signal.

6. In a control system, the combination of, electronic amplifier means providing an amplified output current variable in magnitude with changes of a variable input signal, an energy storage device controlling said output current and operable to decrease the same as the amount of stored energy increases, a discharge circuit connected to said device for release of energy therefrom, means providing a current source, a charging circuit operable when closed to connect said source to said device to increase the amount of energy stored therein, a detenting circuit including said source and operable when closed to apply a bias to said amplifier means for increasing said output current, and a current sensing device controlling said charging and detenting circuits in response to said output current and operable to complete the circuits when the value of the current is above a high level and to interrupt the circuits upon decrease of the current to a low level, said detenting circuit producing abrupt changes in the level of said output current as the latter increases through said high level and decreases through said low level and said energy storage device operating, after completion of said charging circuit, to decrease the output current gradually to said low value at the end of a time interval proportional to the magnitude of said input signal.

7. In a control system, the combination of, electronic amplifier means providing an amplified output current variable in magnitude with changes of a variable input signal, a capacitor controlling said output current and operable to decrease the same as the capacitor charge increases, a discharge circuit connected to said capacitor for reducing said charge, a charging circuit operable when closed to increase the charge of said capacitor, a detenting circuit operable when closed to apply a bias to said amplifier means for increasing said output current, and a current sensing device controlling said charging and detenting circuits in response to said output current and operable to complete the circuits when the value of the current is above a high level and to interrupt the circuits upon decrease of the current to a low level, said detenting circuit producing abrupt changes in the level of said output current as the latter increases through said high level and decreases through said low level and said capacitor operating, after completion of said charging circuit, to decrease the output current gradually to said low value at the end of a time interval proportional to the magnitude of said input signal.

8. In a control system, the combination of, electronic amplifier means providing an amplified output current variable in magnitude with changes of a variable input signal, an energy storage device controlling said output current and operable to decrease the same as the amount of stored energy increases, a discharge circuit connected to said device for release of energy therefrom at a discharge rate, a charging circuit operable when closed to deliver energy to said device at a rate faster than said discharge rate, a detenting circuit operable when closed to apply a bias to said amplifier means for increasing said output current, and a current sensing device controlling said charging and detenting circuits in response to said output current and operable to complete the circuits when the value of the current is above a high level and to interrupt the circuits upon decrease of the current to a low level, said detenting circuit producing abrupt changes in the level of said output current as the latter increases through said high level and decreases through said low level and said energy storage device operating, after completion of said charging circuit, to decrease the output current gradually to said low value at the end of a time interval proportional to the magnitude of said input signal.

9. In a control system, the combination of, a member movable in opposite directions to increase and decrease the value of a condition being controlled, means for moving said member including two relays each operable when pulled in to complete a circuit for moving the member in a different one of said directions, means controlling pull-in and drop-out of said relays and operable in response to deviation of said condition in each direction from a desired value to effect pull-in of the corresponding relay and movement of said member in the proper direction to correct the condition, detent means individual to each of said relays and operable in response to pull-in and drop-out of the relay respectively to increase and decrease the relay current abruptly, and pulsing means controlling the current supplied to each of said relays by said controlling means and operable in response to pull-in of each relay to reduce the current of the relay to the drop-out value at the end of an interval directly proportional to the amount of deviation of said condition from said desired value and, in response to drop-out of the relay, to permit increase of the current of the relay to the pull-in value at the end of an interval inversely proportional to the amount of deviation.

10. In a system for controlling a condition, the combination of, a regulator operable to correct for deviations in said condition from a desired control value, a relay controlling operation of said regulator, control means operable to vary the energizing current of said relay in accordance with deviations of said condition from said desired value, detent means cooperating with said control means to vary said relay current and operable in response to pull-in and drop-out of the relay respectively to increase and decrease the relay current abruptly, and pulsing means controlling the current supplied to said relay by said control means and operable in response to pull-in and drop-out of the relay respectively to reduce the relay current to the drop-out value and to increase the relay current to the pull-in value at the ends of time intervals which vary in proportion to the amount of deviation of said condition from said desired value.

11. In a system for controlling a condition, the combination of, a regulator operable to correct for deviations in said condition from a desired control value, a relay controlling operation of said regulator, control means operable to vary the energizing current of said relay in accordance with deviations of said condition from said desired value, detent means cooperating with said control means to vary said relay current and operable in response to pull-in and drop-out of the relay respectively to increase and decrease the relay current abruptly, and pulsing means controlling the current supplied to said relay by said control means and cooperating therewith to vary the current in opposition to and at a slower rate than said detent means in response to pull-in and drop-out of said relay, said control means, said detent means, and said pulsing means cooperating to vary the ratio of pull-in time of said relay to drop-out time thereof in proportion to the amount of deviation of said condition from said desired value.

References Cited in the file of this patent

UNITED STATES PATENTS

| | | |
|---|---|---|
| 2,534,801 | Siltamaki | Dec. 19, 1950 |
| 2,787,742 | Fronsen | Apr. 2, 1957 |

FOREIGN PATENTS

| | | |
|---|---|---|
| 724,903 | Great Britain | Feb. 23, 1955 |